(12) United States Patent
Nair et al.

(10) Patent No.: US 9,135,322 B2
(45) Date of Patent: Sep. 15, 2015

(54) ENVIRONMENT CLASSIFICATION

(75) Inventors: Manoj Nair, Cary, NC (US); Stephen R Perrin, Chapel Hill, NC (US); Iva Blazina Vukelja, Everett, MA (US); Arun Dugganapally, Charlestown, MA (US); Mark Weng Soon Wah, Cary, NC (US)

(73) Assignee: EMC CORPORATION, Hopkinton, MA (US)

( * ) Notice: Subject to any disclaimer, the term of this patent is extended or adjusted under 35 U.S.C. 154(b) by 40 days.

(21) Appl. No.: 11/528,898

(22) Filed: Sep. 27, 2006

(65) Prior Publication Data

US 2008/0071727 A1    Mar. 20, 2008

Related U.S. Application Data

(60) Provisional application No. 60/826,072, filed on Sep. 18, 2006, provisional application No. 60/826,073, filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
*G06F 17/00* (2006.01)
*G06F 17/30* (2006.01)
(Continued)

(52) U.S. Cl.
CPC .... *G06F 17/30598* (2013.01); *G06F 17/30115* (2013.01); *H04L 41/12* (2013.01); *H04L 41/5003* (2013.01); *H04L 41/5009* (2013.01); *H04L 67/16* (2013.01);
(Continued)

(58) Field of Classification Search
USPC ............................ 707/104.1, 100, 3, 10, 603
See application file for complete search history.

(56) References Cited

U.S. PATENT DOCUMENTS 5,678,044 A  * 10/1997  Pastilha et al. ........................ 1/1
6,003,040 A     12/1999  Mital et al.
(Continued)

FOREIGN PATENT DOCUMENTS

EP             1855218  A2    11/2007
WO    WO 2008/036621        3/2008

OTHER PUBLICATIONS

U.S. Appl. No. 11/528,783, Feb. 4, 2015, Office Action.
(Continued)

*Primary Examiner* — Hosain Alam
*Assistant Examiner* — Eliyah S Harper
(74) *Attorney, Agent, or Firm* — Workman Nydegger

(57) ABSTRACT

A method and system for classifying environment components within a computer system. The computer system includes an information management service for defining services to be provided to data objects residing in the computer system. One exemplary method identifies environment components, such as servers, storage locations, databases, applications, and the like, within the computer system. The service level capabilities of each of the environment components are then identified. The environment components are then classified in accordance with their identified service level capabilities. By categorizing the environment components in accordance with their service level capabilities, the service level objective requests of data objects residing in the system can efficiently be matched to the environment components that are capable of providing the requested services.

20 Claims, 4 Drawing Sheets

(51) Int. Cl.
*H04L 12/24* (2006.01)
*H04L 29/08* (2006.01)

(52) U.S. Cl.
CPC ... *G06F 17/30899* (2013.01); *Y10S 707/99931* (2013.01); *Y10S 707/99942* (2013.01)

(56) References Cited

U.S. PATENT DOCUMENTS

| | | | |
|---|---|---|---|
| 6,167,445 A | 12/2000 | Gai et al. | |
| 6,308,216 B1* | 10/2001 | Goldszmidt et al. | 709/236 |
| 6,349,297 B1 | 2/2002 | Shaw et al. | |
| 6,363,053 B1 | 3/2002 | Schuster et al. | |
| 6,430,613 B1 | 8/2002 | Brunet et al. | |
| 6,591,300 B1 | 7/2003 | Yurkovic | |
| 6,633,312 B1 | 10/2003 | Rochford et al. | |
| 6,862,594 B1* | 3/2005 | Saulpaugh et al. | 1/1 |
| 6,865,728 B1 | 3/2005 | Branson et al. | |
| 6,970,869 B1* | 11/2005 | Slaughter et al. | 1/1 |
| 7,028,312 B1 | 4/2006 | Merrick et al. | |
| 7,185,073 B1* | 2/2007 | Gai et al. | 709/221 |
| 7,240,076 B2 | 7/2007 | McCauley et al. | |
| 7,278,156 B2 | 10/2007 | Mei et al. | |
| 7,412,518 B1* | 8/2008 | Duigou et al. | 709/227 |
| 7,433,304 B1 | 10/2008 | Galloway et al. | |
| 7,543,020 B2 | 6/2009 | Walker et al. | |
| 7,548,915 B2 | 6/2009 | Ramer et al. | |
| 7,565,324 B2 | 7/2009 | Vincent | |
| 7,580,357 B2 | 8/2009 | Chang et al. | |
| 7,613,806 B2 | 11/2009 | Wright et al. | |
| 7,616,642 B2 | 11/2009 | Anke et al. | |
| 7,676,798 B2 | 3/2010 | Snover et al. | |
| 7,720,950 B2* | 5/2010 | Joanovic et al. | 709/223 |
| 7,725,570 B1 | 5/2010 | Lewis | |
| 7,725,571 B1 | 5/2010 | Lewis | |
| 7,730,172 B1 | 6/2010 | Lewis | |
| 7,734,765 B2 | 6/2010 | Musman et al. | |
| 7,739,239 B1 | 6/2010 | Cormie et al. | |
| 7,895,220 B2 | 2/2011 | Evans et al. | |
| 7,953,740 B1 | 5/2011 | Vadon et al. | |
| 8,069,435 B1 | 11/2011 | Lai | |
| 8,104,080 B2 | 1/2012 | Burns et al. | |
| 8,548,964 B1 | 10/2013 | Nair et al. | |
| 8,620,724 B2 | 12/2013 | Adhiraju et al. | |
| 2002/0016800 A1 | 2/2002 | Spivak et al. | |
| 2002/0038307 A1* | 3/2002 | Obradovic et al. | 707/102 |
| 2002/0091746 A1 | 7/2002 | Umberger et al. | |
| 2002/0109713 A1* | 8/2002 | Carchidi et al. | 345/738 |
| 2002/0120685 A1 | 8/2002 | Srivastava et al. | |
| 2002/0161883 A1 | 10/2002 | Matheny et al. | |
| 2003/0023712 A1 | 1/2003 | Zhao et al. | |
| 2003/0036886 A1 | 2/2003 | Stone | |
| 2003/0041050 A1 | 2/2003 | Smith et al. | |
| 2003/0140009 A1 | 7/2003 | Namba et al. | |
| 2003/0167180 A1 | 9/2003 | Chung et al. | |
| 2003/0196108 A1 | 10/2003 | Kung | |
| 2003/0225829 A1 | 12/2003 | Pena et al. | |
| 2003/0233464 A1 | 12/2003 | Walpole et al. | |
| 2003/0236904 A1 | 12/2003 | Walpole et al. | |
| 2004/0060002 A1 | 3/2004 | Lucovsky et al. | |
| 2004/0098415 A1 | 5/2004 | Bone et al. | |
| 2004/0133876 A1 | 7/2004 | Sproule | |
| 2004/0210601 A1* | 10/2004 | Takayama | 707/104.1 |
| 2004/0236660 A1 | 11/2004 | Thomas et al. | |
| 2004/0243699 A1 | 12/2004 | Koclanes et al. | |
| 2005/0060662 A1 | 3/2005 | Soares et al. | |
| 2005/0102297 A1 | 5/2005 | Lloyd et al. | |
| 2005/0131982 A1 | 6/2005 | Yamasaki et al. | |
| 2005/0132034 A1 | 6/2005 | Iglesia et al. | |
| 2005/0177545 A1 | 8/2005 | Buco et al. | |
| 2005/0235342 A1 | 10/2005 | Ene-Pietrosanu et al. | |
| 2005/0251533 A1 | 11/2005 | Harken et al. | |
| 2005/0273451 A1 | 12/2005 | Clark et al. | |
| 2005/0289216 A1 | 12/2005 | Myka et al. | |
| 2006/0015388 A1 | 1/2006 | Flockhart et al. | |
| 2006/0036463 A1 | 2/2006 | Patrick et al. | |
| 2006/0039364 A1 | 2/2006 | Wright | |
| 2006/0092861 A1 | 5/2006 | Corday et al. | |
| 2006/0095543 A1 | 5/2006 | Ito et al. | |
| 2006/0095570 A1 | 5/2006 | O'Sullivan | |
| 2006/0106782 A1 | 5/2006 | Blumenau et al. | |
| 2006/0112108 A1* | 5/2006 | Eklund et al. | 707/100 |
| 2006/0114832 A1 | 6/2006 | Hamilton et al. | |
| 2006/0123030 A1* | 6/2006 | Musteata et al. | 707/101 |
| 2006/0129415 A1 | 6/2006 | Thukral et al. | |
| 2006/0129974 A1 | 6/2006 | Brendle et al. | |
| 2006/0179143 A1* | 8/2006 | Walker et al. | 709/226 |
| 2006/0248165 A1 | 11/2006 | Sridhar et al. | |
| 2006/0248187 A1 | 11/2006 | Thorpe et al. | |
| 2007/0038683 A1 | 2/2007 | Dixon et al. | |
| 2007/0055689 A1 | 3/2007 | Rhoads et al. | |
| 2007/0058632 A1 | 3/2007 | Back et al. | |
| 2007/0061363 A1 | 3/2007 | Ramer et al. | |
| 2007/0070894 A1 | 3/2007 | Wang et al. | |
| 2007/0083875 A1 | 4/2007 | Jennings | |
| 2007/0094392 A1 | 4/2007 | Stone et al. | |
| 2007/0103984 A1 | 5/2007 | Kavuri et al. | |
| 2007/0104208 A1 | 5/2007 | Svensson | |
| 2007/0127370 A1 | 6/2007 | Chang et al. | |
| 2007/0153802 A1 | 7/2007 | Anke et al. | |
| 2007/0162749 A1 | 7/2007 | Lim | |
| 2007/0192352 A1 | 8/2007 | Levy | |
| 2007/0208751 A1 | 9/2007 | Cowan et al. | |
| 2007/0214208 A1 | 9/2007 | Balachandran | |
| 2007/0260640 A1 | 11/2007 | Hamilton et al. | |
| 2007/0294406 A1 | 12/2007 | Suer et al. | |
| 2007/0299828 A1 | 12/2007 | Lewis et al. | |
| 2008/0002678 A1 | 1/2008 | Klessig et al. | |
| 2008/0005086 A1 | 1/2008 | Moore | |
| 2008/0021850 A1 | 1/2008 | Irle et al. | |
| 2008/0049642 A1* | 2/2008 | Gudipudi et al. | 370/254 |
| 2008/0059387 A1 | 3/2008 | Vaidhyanathan et al. | |
| 2008/0071726 A1 | 3/2008 | Nair et al. | |
| 2008/0071813 A1 | 3/2008 | Nair et al. | |
| 2008/0071908 A1 | 3/2008 | Nair et al. | |
| 2008/0077682 A1 | 3/2008 | Nair et al. | |
| 2008/0077995 A1 | 3/2008 | Curnyn et al. | |
| 2008/0097923 A1 | 4/2008 | Kim et al. | |
| 2008/0114725 A1 | 5/2008 | Indeck et al. | |
| 2008/0134043 A1 | 6/2008 | Georgis et al. | |
| 2008/0177994 A1 | 7/2008 | Mayer | |
| 2008/0243900 A1 | 10/2008 | Yohanan et al. | |
| 2008/0301760 A1 | 12/2008 | Lim | |
| 2009/0064185 A1 | 3/2009 | Araujo | |
| 2009/0077210 A1 | 3/2009 | Musman et al. | |
| 2009/0106100 A1* | 4/2009 | Mashinsky | 705/14 |
| 2009/0150431 A1 | 6/2009 | Schmidt et al. | |
| 2010/0250497 A1 | 9/2010 | Redich et al. | |
| 2013/0110840 A1 | 5/2013 | Nair et al. | |

OTHER PUBLICATIONS

U.S. Appl. No. 11/772,179, Jul. 3, 2014, Final Office Action.
U.S. Appl. No. 11/864,596, Jun. 16, 2014, Notice of Allowance.
U.S. Appl. No. 11/864,760, Jan. 28, 2015, Decision on Appeal.
U.S. Appl. No. 11/864,770, May 16, 2014, Final Office Action.
U.S. Appl. No. 11/864,770, Dec. 5, 2014, Office Action.
U.S. Appl. No. 11/864,764, Jun. 25, 2014, Final Office Action.
U.S. Appl. No. 11/864,764, Jan. 16, 2015, Office Action.
U.S. Appl. No. 13/414,512, Sep. 30, 2014, Notice of Allowance.
U.S. Appl. No. 11/528,783, Aug. 15, 2012, Final Office Action.
U.S. Appl. No. 11/528,790, Jul. 18, 2012, Final Office Action.
U.S. Appl. No. 11/694,753, Nov. 30, 2012, Notice of Allowance.
U.S. Appl. No. 11/694,764, Aug. 1, 2012, Office Action.
U.S. Appl. No. 11/772,192, Jun. 12, 2012, Final Office Action.
U.S. Appl. No. 11/864,605, Jul. 3, 2012, Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/528,790, Jul. 12, 2010, Office Action.
U.S. Appl. No. 11/692,058, Jul. 6, 2010, Office Action.
U.S. Appl. No. 11/694,764, Aug. 4, 2010, Final Office Action.
U.S. Appl. No. 11/864,596, May 26, 2010, Final Office Action.

(56) References Cited

OTHER PUBLICATIONS

U.S. Appl. No. 11/864,605, May 28, 2010, Final Office Action.
U.S. Appl. No. 11/864,760, Jul. 27, 2010, Office Action.
U.S. Appl. No. 11/528,772, Mar. 3, 2011, Office Action.
U.S. Appl. No. 11/528,790, Jan. 13, 2011, Final Office Action.
U.S. Appl. No. 11/692,058, Jan. 24, 2011, Notice of Allowance.
U.S. Appl. No. 11/694,753, Jan. 19, 2011, Office Action.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,760, Jan. 27, 2011, Final Office Action.
U.S. Appl. No. 11/864,764, Jan. 27, 2011, Office Action.
U.S. Appl. No. 11/528,772, Jan. 28, 2010, Office Action.
U.S. Appl. No. 11/694,753, Mar. 29, 2010, Office Action.
U.S. Appl. No. 11/692,051, Feb. 19, 2010, Notice of Allowance.
U.S. Appl. No. 11/692,051, Mar. 31, 2010, Notice of Allowance.
U.S. Appl. No. 11/694,764, Jan. 28, 2010, Office Action.
U.S. Appl. No. 11/772,179, Feb. 23, 2010, Final Office Action.
U.S. Appl. No. 11/864,770, Apr. 21, 2010, Final Office Action.
U.S. Appl. No. 11/772,192, Apr. 15, 2010, Office Action.
U.S. Appl. No. 11/864,760, Apr. 7, 2010, Final Office Action.
U.S. Appl. No. 11/528,772, Oct. 27, 2011, Notice of Allowance.
U.S. Appl. No. 11/528,790, Jan. 23, 2012, Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,192, Jan. 5, 2012, Office Action.
U.S. Appl. No. 11/864,596, Oct. 7, 2011, Final Office Action.
U.S. Appl. No. 11/864,764, Aug. 29, 2011, Final Office Action.
U.S. Appl. No. 11/864,774, Dec. 9, 2011, Final Office Action.
U.S. Appl. No. 11/772,179, Oct. 11, 2013, Office Action.
U.S. Appl. No. 11/772,192, Aug. 12, 2013, Notice of Allowance.
U.S. Appl. No. 11/528,783, Feb. 24, 2009, Office Action.
U.S. Appl. No. 11/528,900, Jan. 23, 2009, Final Office Action.
U.S. Appl. No. 11/694,753, Mar. 25, 2009, Office Action.
U.S. Appl. No. 11/694,783, Feb. 6, 2009, Office Action.
U.S. Appl. No. 13/414,512, Mar. 14, 2014, Final Office Action.
U.S. Appl. No. 13/719,084, Jul. 26, 2013, Office Action.
U.S. Appl. No. 13/719,084, Jan. 6, 2014, Notice of Allowance.
U.S. Appl. No. 13/972,089, filed Aug. 21, 2013, Nair et al.
Gasser et al., "An Architecture for Practical Delegation in a Distributed System", 1990 IEEE Computer Society Symposium, May 7-9, 1990, pp. 20-30.
U.S. Appl. No. 11/528,790, May 8, 2014, Notice of Allowance.
U.S. Appl. No. 13/972,089, Apr. 16, 2014, Notice of Allowance.
U.S. Appl. No. 11/528,790, Jan. 10, 2014, Final Office Action.
U.S. Appl. No. 11/864,770, Nov. 26, 2013, Office Action.
U.S. Appl. No. 11/864,764, Nov. 20, 2013, Office Action.
U.S. Appl. No. 11/528,772, Sep. 12, 2008, Pre-Interview First Office Action.
U.S. Appl. No. 11/528,783, Nov. 7, 2008, Pre-Interview First Office Action.
U.S. Appl. No. 11/694,753, Jun. 17, 2011, Final Office Action.
U.S. Appl. No. 11/864,770, Apr. 19, 2011, Final Office Action.
U.S. Appl. No. 11/864,774, May 11, 2011, Office Action.
U.S. Appl. No. 11/694,753, Nov. 18, 2009, Final Office Action.
U.S. Appl. No. 11/692,051, filed Mar. 27, 2007, Perrin et al.
U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell, II.
U.S. Appl. No. 11/772,192, filed Jun. 30, 2007, Nair et al.
U.S. Appl. No. 11/528,900, Jun. 9, 2008, Office Action.
U.S. Appl. No. 13/414,512, filed Mar. 7, 2012, Nair et al.
U.S. Appl. No. 11/528,783, Feb. 14, 2012, Office Action.
U.S. Appl. No. 11/772,179, Mar. 29, 2012, Office Action.
U.S. Appl. No. 11/864,764, May 3, 2012, Office Action.
U.S. Appl. No. 11/864,770, Feb. 4, 2013, Office Action.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Jun. 17, 2013, Office Action.
U.S. Appl. No. 11/694,764, May 21, 2013, Notice of Allowance.
U.S. Appl. No. 11/864,605, May 24, 2013, Notice of Allowance.
U.S. Appl. No. 11/864,770, Jun. 13, 2013, Final Office Action.
U.S. Appl. No. 11/864,774, Apr. 15, 2013, Notice of Allowance.
U.S. Appl. No. 13/414,512, Aug. 1, 2013, Office Action.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/528,783, Jan. 15, 2010, Office Action.
U.S. Appl. No. 11/692,058, Jan. 8, 2010, Final Office Action.
U.S. Appl. No. 11/864,596, Nov. 12, 2009, Office Action.
U.S. Appl. No. 11/864,770, Nov. 27, 2009, Office Action.
U.S. Appl. No. 11/864,760, Nov. 24, 2009, Office Action.
U.S. Appl. No. 11/864,605, Jan. 14, 2010, Office Action.
U.S. Appl. No. 11/694,753, Oct. 5, 2010, Final Office Action.
U.S. Appl. No. 11/772,192, Oct. 29, 2010, Final Office Action.
U.S. Appl. No. 11/864,605, Nov. 4, 2010, Office Action.
U.S. Appl. No. 11/864,770, Nov. 3, 2010, Office Action.
U.S. Appl. No. 11/694,753, Aug. 31, 2012, Notice of Allowance.
U.S. Appl. No. 11/694,764, Nov. 29, 2012, Final Office Action.
U.S. Appl. No. 11/772,179, Nov. 13, 2012, Final Office Action.
U.S. Appl. No. 11/864,605, Nov. 8, 2012, Final Office Action.
U.S. Appl. No. 11/864,764, Dec. 10, 2012, Final Office Action.

* cited by examiner

ENVIRONMENT CLASSIFICATION

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND

1. The Field of the Invention

The present invention relates generally to information management services. More specifically, the present invention relates to methods and systems for classifying the environment components of a computer system for use in assigning service areas and service level objectives to data objects residing within the computer system.

2. The Relevant Technology

Modern computer systems allow for the interchange of data and resources through network environments. For example, a modern computer network may include a number of interconnected client computers. The computer network may further include resources. Such resources may be, for example and not limited to, file servers for storing data accessible by the clients, print servers for providing access to printers to the clients, and shared stores on client computers for storing data to be made available to other clients and resources on the network.

In this society where many personal and business interactions are data driven, the ability to provide protection, retention, recovery, security, and other services to data have become important features of computer networks. Establishing a system to provide these services can be costly, both in terms of the equipment and applications necessary to perform the services and particularly in terms of the time required to configure and manage the system. As the amount of data stored by a system increases and the storage systems become more complex, the ability to customize the services provided to each data file is of greater importance.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
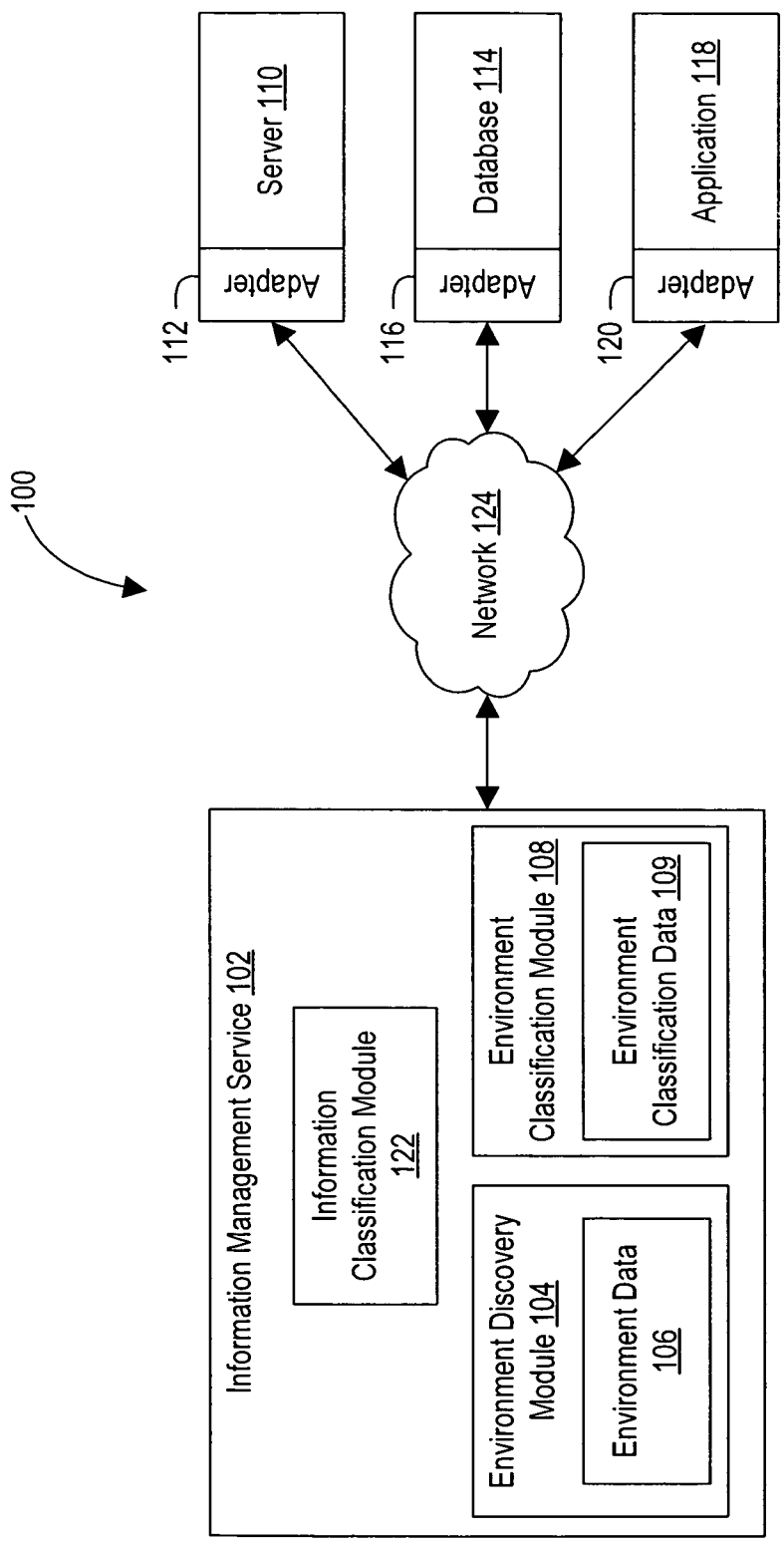
FIG. 1 illustrates a computer system having an information management service configured for classifying the environment components of the computer system.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to methods and systems for classifying environment components within a computer system. The computer system includes an information management service for defining services to be provided to data objects residing in the computer system. One exemplary method identifies environment components, such as servers, storage locations, databases, applications, and the like, within the computer system. The service level capabilities of each of the environment components are then identified. The service level capabilities may describe, for example, the service areas and service levels that each of the environment components is able to provide to data objects within the computer system. The environment components are then classified in accordance with their identified service level capabilities. By categorizing the environment components in accordance with their service level capabilities, the service requests of data objects residing in the system can efficiently be matched to the environment components that are capable of providing the requested services.

As used herein, the terms "data" and "data object" may include, but are not limited to, files, directories (e.g., volumes, file systems, and the like), user data, system data, applications, services, operating systems, instructions, and the like, that can be stored on one or more storage devices of a computer. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Certain embodiments described herein will involve electronic communication between a client computer system (hereinafter referred to as a "client") requesting access to a network service at a server computer system (hereinafter referred to as a "server"). Accordingly, the client sends a request to the server for particular access to its system resources, wherein if the client is authorized and validated, the server responds with a response message providing the desired information. Of course, other messaging patterns between client and server are available, as are well known in the art.

It should be appreciated that the present invention can be implemented in numerous ways, including as a process, an apparatus, a system, a device, a method, or a computer readable medium such as a computer-readable storage medium or a computer network wherein program instructions are sent over optical or electronic communication links. A general purpose computer system such as an Intel-based processor running Microsoft Windows or Linux may be used, or a specialized appliance may be used.

Referring now to FIG. 1, a computer system 100 is illustrated having various environment components, including a server 110, a database 114, and an application 118. An information management service 102 is provided for discovering and for classifying the environment components 110, 114, and 118 that exist within the computer system 100. Although only three environment components are illustrated in FIG. 1, more or less environment components may exist within the computer system 100. The computer system 100 may include a single computer, a local area network (LAN), metropolitan area networks (MAN), a wide area network (WAN), and the like and combinations thereof. The environment components 110, 114 and 118 and the information management service 102 may be located a locally or at a remote location in relation to the clients utilizing the information management service 102.

The environment components 110, 114, and 118 may provide a variety of services to the computer system 100 and to the data residing therein. For example, the server 110 may act as a storage server, retention server, data migration server, backup server, recovery server, data protection server, and the like or any combination thereof. The database 114, for example, may act as an exchange database, a payroll database, and the like or any combination thereof. The application 118 may include, for example, a data indexer, a data miner, a data transport, a security application, and the like or any combination thereof.

A large variety of data objects may be stored within the computer system 100. The data objects stored within the computer system 100 may have a variety of service level objectives. The service level objectives requested by a data object may be characterized by set of a service areas and a set of service levels. Service areas include generalized areas of service that may be performed on a data object, including data protection (e.g., frequency of backup, redundancy of data, and the like), data retention, data security (e.g., encryption, access control, and the like), data migration, data indexing, and the like. Service levels define the extent at which a service area is provided to the data object. For example, a service area may include data backup. Data backup may include various service levels, including an hourly backup, a daily backup, a weekly backup, a monthly backup, and the like.

The services required by each of the data objects may be imposed by the system administrator, governmental standards and regulations, company guidelines, and the like or any combination thereof. A single data object typically requires multiple services from more than one service area. The combination of services requested by a single data object is referred to herein as a "target service package."

A large computer system, such as an enterprise network, may include a large variety of data objects having various unique properties. Consequently, the data objects within a computer system may also request many different service level objectives. By way of example, certain data objects must be retained for one year, while other types of data objects must be retained indefinitely. Likewise, certain data objects must be indexed, while indexing is not necessary or may be overly expensive or may waste valuable resources when performed for other types of data objects. In addition, certain data objects must be saved to a backup location at least once per day, while other types of data objects only need to be saved to the backup location once every week. Within a company or enterprise network, documents created by one division within the company may require a higher level of service than documents created by another division within the company. Furthermore, documents containing predefined words, phrases, or data patterns may require higher levels of service than other types of documents. Other examples of differing service areas and differing service levels required by data within the system will also be evident to one of ordinary skill in the art.

In order to efficiently determine the service level objectives of each data object residing in the computer system 100, the data objects may be classified using the information classification module 122. In general, the information classification module 122 may perform an automated classification process, which may classify the data objects in accordance with a predefined set of rules. The data objects may be classified based on a number of factors, including the content contained within each data object, the organization, group or individual that created the data object, the metadata associated with each data object, and the like and any combination thereof. The metadata may be used to determine the date of last use of the data object, owner of the data object, date of creation, file size, file type, disposition date, content of the object, and the like.

Once the data objects within the computer system 100 are classified using the information classification module 122, it is necessary to match the service level objectives of each data object to a service provider (i.e., environment component 110, 114, or 118) that is capable of providing those services level objectives. However, environment components 110, 114, or 118 are often limited as to the service areas and service levels that they are capable of providing. For example, the server 110 may be capable of providing a low level of security services for certain data files that do not require a high level of security, but the server 110 may be incapable of providing high level security services to highly confidential files. Therefore, it may be advantageous to classify the environment components in accordance with the service areas and service levels that each environment component is capable of providing.

Classifying the environment of the computer system 100 may be performed by the environment discovery and classification module 104 as a two step process. First, the system environment is discovered, and second, the discovered environment components are classified in accordance with their service level capabilities. In general, the environment discovery module 106 may create a detailed diagram of each environment component 110, 114, 118 contained within the computer system 100, as well as the manner in which each environment component interfaces with the other environment components and subsystems within the computer system 100. In order to create a detailed diagram, the environment discovery module 104 may rely on adapters 112, 116, and 120 that are specifically configured to communicate with and gather information from specific environment components 110, 114, and 118, respectively.

The environment discovery process may be performed, for example, by searching all IP addresses on the network in order to discover the environment components 110, 114, and 118 that are located on the network 124, analyzing the specific details of each of the environment components, for example, by employing the adapters 112, 116, 120, and determining the service areas and service level capabilities of each of the environment components by analyzing the settings and properties of the environment components.

In order to classify the environment components 110, 114 and 118, the environment classification module 108 first identifies the environment components compiled by the environment discovery module 106. The environment classification module 108 analyzes the system environment data 106 in order to identify the service level capabilities of the environment components 110, 114 and 118. As described previously, the service level capabilities include the service areas and service levels that each of the environment components 110, 114 and 118 is able to provide to the data objects and other environment components located within the computer system 100.

The environment classification module 108 can then classify the environment components based on their service level capabilities. In one embodiment, the classification procedure includes generating a detailed list of all service areas and service levels that each of the environment components 110, 114 and 118 is capable of performing. In another embodiment, the classification procedure includes assigning a generic descriptor to each environment component 110, 114 and 118 for classifying the environment in accordance with the service areas and service levels that can be provided. For example, storage servers may generically be classified as "tier 1 storage", "tier 2 storage", and the like, in accordance with the quality and type of storage that the storage server is capable of providing. Tier 1 storage servers may include high-speed reliable storage devices, while lower tiered storage servers may include slower storage devices that may have lower redundancy and reliability and are less costly than the high-speed devices.

In one embodiment, the environment classification module 109 uses a predefined set of rules when classifying the environment components 110, 114 and 118. The set of rules can be applied to the discovered system environment data in order to efficiently and automatically classify the environment components 110, 114 and 118 in accordance with their service level capabilities.

In one embodiment, the environment classification module 108 analyses the metadata affiliated with each environment component 110, 114 and 118 while performing environment classification. The metadata associated with each environment component 110, 114 and 118 may identify features of the environment such as the name and version number of the environment component, a system identifier, service level capabilities, and the like and combinations thereof.

In one embodiment, the environment classification module 108 may generate metadata for each of the environment components for describing the manner in which they were classified. The creation of the metadata can be done manually, by the user, or automatically through various programmatic methods, or some combination of manual and automatic methods. The generated metadata may be stored as environment classification data 109. The generated metadata can be accessed at a later time, for example, when the service level objectives of each data object are matched to the environment components that are capable of providing the service level objectives.

In one embodiment, environment components are classified based on the service areas and service levels that the applications are capable of providing. For example, a first backup server may provide a particular class of information protection service, such as daily backups, and a second backup server may provide a different class of information protection service, such as continuous data protection (CDP).

In another embodiment, storage locations are classified based on the service levels that can be provided to the data objects stored at each of the storage locations. In some instances, the services that can be provided to data objects are location-dependant. In other words, the services that are available in a computer system can often only be performed if a data object is located at a specific location. For example, a computer system may include three primary storage locations. The computer system may further include a data indexer that is only capable of indexing data that is located on two of the three primary storage locations. Therefore, when the three primary storage locations are categorized, the categorization will be performed in accordance with whether the data objects stored at the primary storage locations can be indexed by the data indexer, among other factors.

In another embodiment, storage locations are classified based on the data protection services that the storage location requires in order to provide sufficient protection to the data objects it contains. For example, a first storage location containing data of high importance may be classified such that a snapshot engine will perform a snapshot backup of the storage location once every hour, while a second storage location containing data of low importance may be classified such that the snapshot engine will only perform a snapshot backup once every week.

In another embodiment, environment components are classified based on the locations within the computer system that the service applications are capable of providing services to. For example, continuing with the above example where a computer system includes three primary storage locations and a data indexer that is only capable of indexing data that is located on two of the three primary storage locations, the ability to provide services to two of the three primary storage locations will be taken into consideration when classifying the data indexer application.

In one embodiment, the adapters 112, 116 and 120 are further utilized by the environment classification module 108 in order to gather additional information that may be relevant to the classification of the environment components 110, 114 and 118. As described previously, each adapter 112, 116 and 120 may be customized for communicating with and gathering information from each of the environment components 110, 114 and 118.

Figure 2:
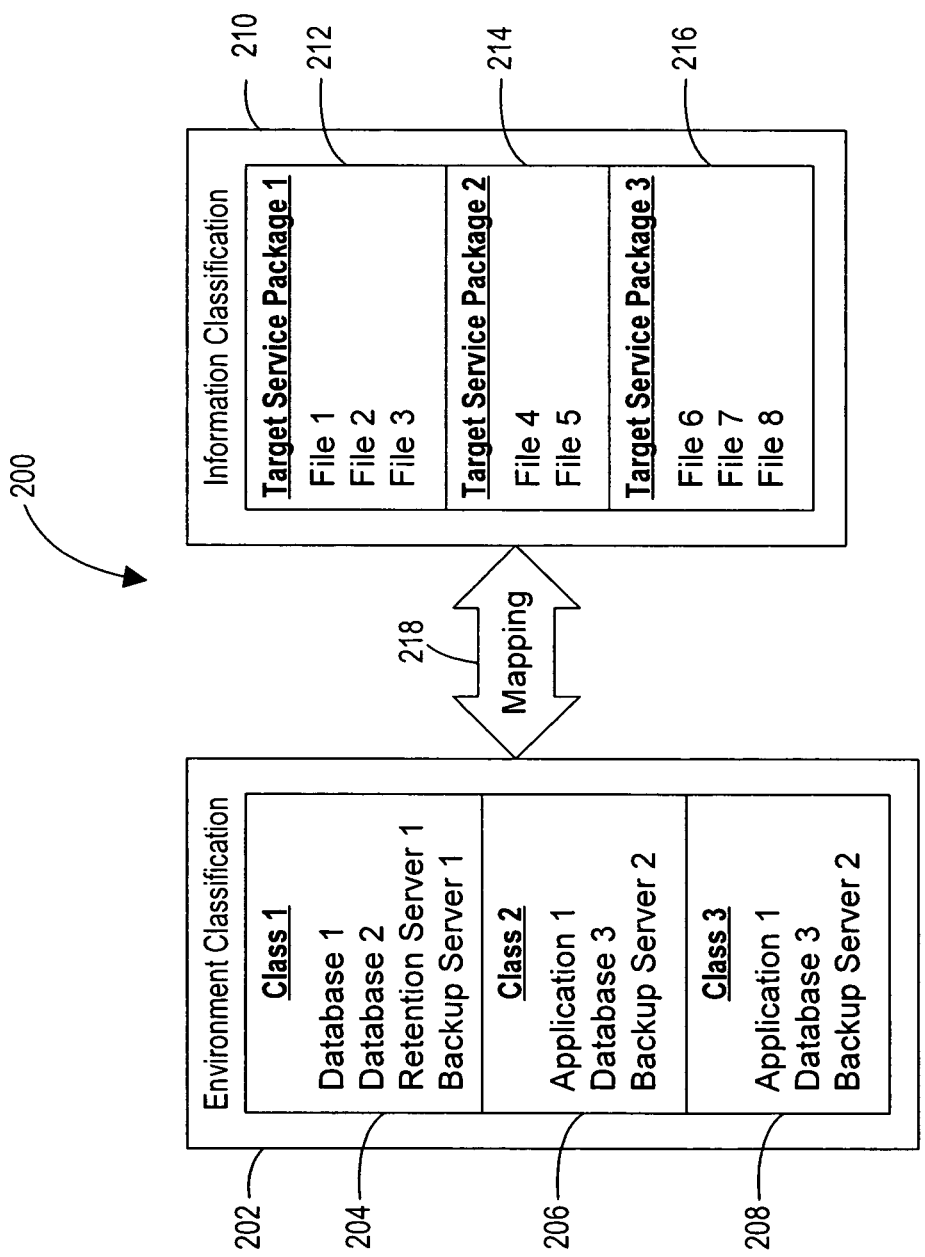
FIG. 2 illustrates an exemplary mapping scheme for matching the service needs of data objects to the appropriate environment components that can provide for those needs.

FIG. 2 provides an illustration of an exemplary mapping scheme 200 for matching the service level objectives of data objects to the environment components that can provide the appropriate service levels. The mapping scheme 200 includes a plurality of environment components that have been classified according to their service level capabilities (environment classification 202). The mapping scheme 200 also includes a plurality of data objects that have been organized in accordance with their service level objectives. The environment components, for purposes of simplicity, have been divided into three classes, including "class 1" 204, "class 2" 206, and "class 3" 208. As described previously, the classification of the environment components may have been based on any number of factors, including the ability of the environment components to provide services, the service needs of each of the environment components, the ability of the environment components to provide services to data objects residing in specific locations within the computer system, and the like and any combination thereof.

The data objects (i.e., files 1-8) have also been organized in accordance with the combination of service level objectives requested by each file. The combination of service level objectives is referred to herein as a "target service package." For example, "Target Service Package 1" 212 may include files that require hourly backup, data indexing, and seven year retention. "Target Service Package 2" 214 may include files that require weekly backup, one year retention, and a high level of security. "Target Service Package 3" 216 may include files that require protection using CDP technology.

In order for the files 1-8 to obtain their requested services as defined by the target service packages 212, 214 and 216, a mapping procedure 218 takes place that matches the service level objectives of the files to the appropriate environment components that are capable of providing those services. In the absence of environment classification 202 and information classification 210, the process of mapping 218 the files to the appropriate environment components could be a tedious process that involves comparing the service needs of each individual file to each individual environment component to determine if the environment component could provide the services needed by the individual files. This process could become particularly complex when considering that each individual file may have multiple service needs.

However, because each of the files have previously been categorized into target service packages 212, 214 and 216, and because each of the environment components have previously been categorized into classes 204, 206 and 208, as described herein, the process of mapping 218 the service level objectives of each of the files to the appropriate environment components becomes much more efficient. When mapping 218 using the environment and information classification described herein, the mapping function can automatically match the files belonging to a target service package 204, 206 or 208 to an environment component belonging to an environment class 204, 206 or 208 that is known to provide the appropriate target service package.

Figure 3:
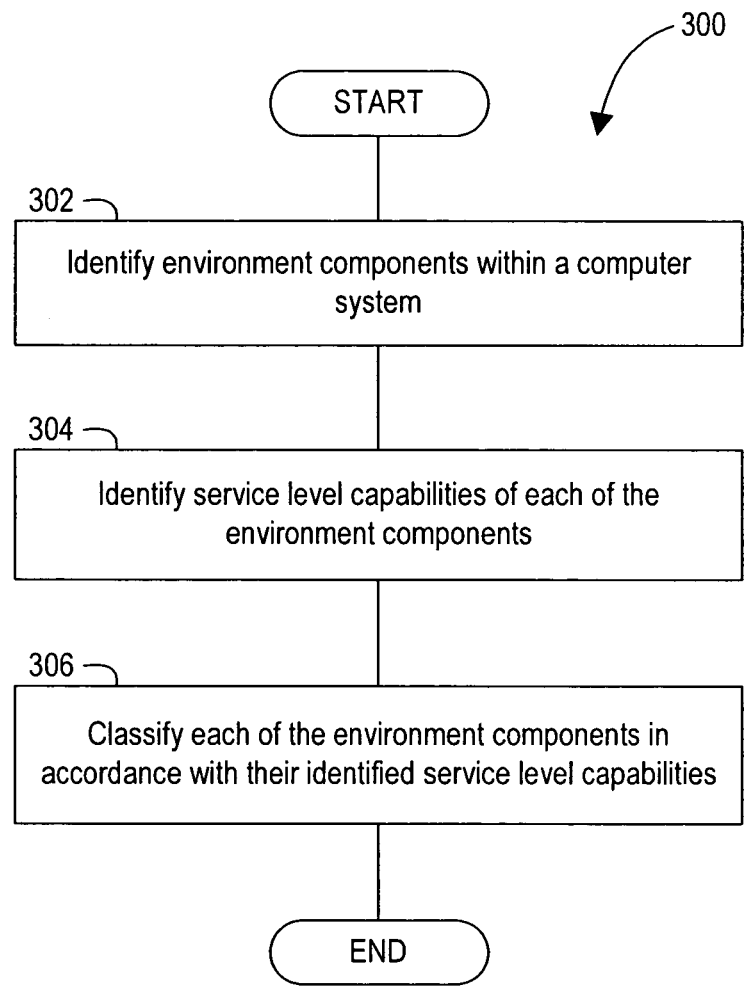
FIGS. 3 and 4 illustrate flow diagrams of methods for classifying environment components within the computer system.

FIG. 3 illustrates one embodiment of a method 300 of classifying environment components within a computer system. The method 300 may be practiced, for example, in a computer system that includes an information management service for defining services to be provided to data objects residing in the computer system. The server system may include one or more computer-readable media having computer-executable instructions, that when executed, implement the method 300. The service first identifies 302 environment components within a computer system. In one embodiment, the environment components are identified by accessing environment information gathered by an environment discovery module. In another embodiment, the information regarding the environment components is manually provided by a user of the system. The environment components may include servers, storage locations, databases, applications, and the like.

The method 300 then identifies 304 service level capabilities of each of the environment components. The service level capabilities may describe, for example, the service areas and service levels that each of the environment components is able to provide to data objects within the computer system. The identification of service level capabilities may be accomplished, for example, by accessing metadata associated with each of the environment components.

The method 300 then classifies 306 each of the environment components in accordance with their identified service level capabilities. In one embodiment, a predefined set of rules is applied to the environment components in order to place each of the environment components into an appropriate category. By categorizing the environment components, the service requests of data objects residing in the system can efficiently be matched to the environment components that are capable of providing the requested services.

Figure 4:
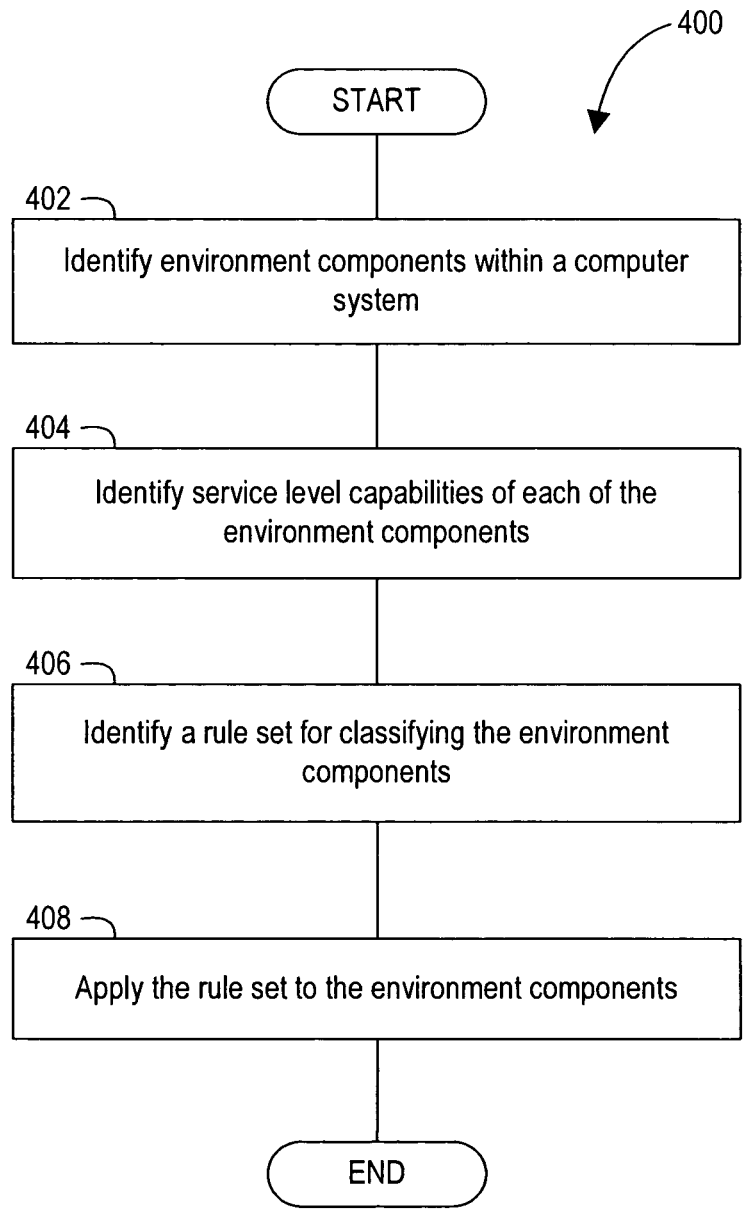

Referring now to FIG. 4, a method 400 is illustrated of classifying environment components within the computer system. The method 400 may be practiced, for example, in a computer system that includes an information management service for defining services to be provided to data objects residing in the computer system. The server system may include one or more computer-readable media having computer-executable instructions, that when executed, implement the method 400.

The method 400 includes identifying 402 environment components within a computer system. The method 400 further identifies 404 service level capabilities of each of the environment components. As explained previously, the service level capabilities may describe the service areas and service levels that each of the environment components is able to provide to data objects within the computer system. The method 400 also identifies 406 a rule set that has been provided for classifying the environment components.

The rule set is applied 408 to the environment components in order to classify each of the environment components in accordance with their identified service level capabilities. The classification of the environment components is performed so that the service requests of each data object residing in the computer system can be efficiently matched to the appropriate environment component.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system that includes an information management service for defining services to be provided to data objects residing in the computer system, a method for performing information management for the data objects within the computer system, the method comprising:
  using an environment discovery module to discover environment components within a computer system, wherein the discovered environment components include one or more service applications;
  identifying service level capabilities of each of the discovered environment components, the service level capabilities describing service areas and service levels that each of the discovered environment components is able to provide to data objects stored in the computer system;
  classifying each of the discovered environment components in accordance with their identified service level capabilities, wherein classifying each of the discovered environment components includes classifying the discovered service applications in accordance with which storage locations within the computer system each of the one or more service applications is capable of providing information management services to;
  storing a detailed diagram of the discovered environment components and a manner in which each discovered environment component interfaces with other discovered environment components;
  discovering data objects stored on the discovered environment components in the computer system, including content contained within each discovered data object, an entity that created each discovered data object, and metadata associated with each discovered data object;
  determining service level objectives for each of the data objects discovered in the computer system;
  determining a target service package for each data object, wherein the target service package for each data object includes the services determined for each data object based on the data object's service level objectives, wherein the data objects associated with the same target service package are grouped together; and
  mapping the discovered and classified environment components to the target service packages, wherein the mapping function occurs before transmitting a request to perform a service for a particular discovered data object; and
  performing services for each data object according to the target service package of each data object, wherein the environment components perform the services for the data objects based on the mapping of the discovered and classified environment components to the target service packages.

2. The method as recited in claim 1, wherein the discovered environment components include at least one of file servers, retention servers, backup servers, databases, and applications.

3. The method as recited in claim 1, wherein using an environment discovery module to discover all environment components within a computer system further comprises accessing environment discovery information from an environment discovery application that has performed an environment discovery operation.

4. The method as recited in claim 1, wherein using an environment discovery module to discover all environment components within a computer system further comprises identifying metadata for each of the discovered environment components describing the capabilities, features, and properties of each of the discovered environment components.

5. The method as recited in claim 1, wherein the discovered environment components include storage locations, wherein classifying each of the discovered environment components further comprises classifying the storage locations in accordance with a combination of service level objectives that can be provided to the discovered data objects stored at each of the storage locations.

6. The method as recited in claim 1, wherein the discovered data objects include at least one of directories, volumes, files, folders, user data, system data, applications, services, operating systems, instructions, and computer settings.

7. The method as recited in claim 1, further comprising:
  generating metadata for each of the discovered environment components for describing their classification.

8. In a computer system that includes an information management service for defining services to be provided to data objects residing in the computer system, a method for performing information management for the data objects within the computer system, the method comprising:
  using an environment discovery module to discover environment components within a computer system;
  identifying service level capabilities of each of the discovered environment components, the service level capabilities describing service areas and service levels that each of the discovered environment components is able to provide to data objects stored within the computer system;
  identifying a rule set for classifying the discovered environment components;
  applying the rule set to the discovered environment components to classify each of the discovered environment components in accordance with their identified service level capabilities so that data objects having predefined service level objective requests can be efficiently matched to the discovered environment components;
  storing a detailed diagram of the discovered environment components and a manner in which each discovered environment component interfaces with other discovered environment components;
  discovering data objects stored on the discovered environment component, including content contained within each discovered data object, an entity that created each discovered data object, and metadata associated with each discovered data object;
  determining service level objectives for each of the data objects discovered in the computer system;
  determining a target service package for each data object, wherein the target service package for each data object includes the services determined for each data object based on the data object's service level objectives, wherein data objects associated with the same target service package are grouped together;
  mapping the discovered and classified environment components to the target service packages, wherein the mapping function occurs before transmitting a request to perform a service for a particular discovered data object; and
  performing services for each data object according to the target service package of each data object, wherein the environment components perform the services for the data objects based on the mapping of the discovered and classified environment components to the target service packages.

9. The method as recited in claim 8, further comprising:
generating metadata for each of the discovered environment components for describing their classification.

10. The method as recited in claim 8, wherein the discovered environment components include at least one of file servers, retention servers, backup servers, databases, and applications.

11. A computer program product for use in a computer system that includes an information management service for defining services to be provided to data objects residing in the computer system, the computer program product used in implementing a method of performing information management for the data objects within the computer system, the computer program product comprising one or more non-transitory computer readable media having stored thereon computer executable instructions that, when executed by one or more processors, cause the computing system to perform the following:
use an environment discovery module to discover all environment components within a computer system;
identify service level capabilities of each of the discovered environment components, the service level capabilities describing the service areas and service levels that each of the discovered environment components is able to provide to data objects stored within the computer system;
classify each of the discovered environment components in accordance with their identified service level capabilities;
store a detailed diagram of the discovered environment components and a manner in which each discovered environment component interfaces with other discovered environment components;
discover data objects stored on the discovered environment component in the computer system, including content contained within each discovered data object, an entity that created each discovered data object, and metadata associated with each discovered data object;
determine service level objectives for each of the data objects discovered in the computer system;
determine a target service package for each data object, wherein the target service package for each data object includes the services determined for each data object based on the data object's service level objectives, wherein the data objects associated with the same target service package are grouped together;
map the discovered and classified environment components to the target service packages, wherein the mapping function occurs before transmitting a request to perform a service for a particular discovered data object; and
perform services for each data object according to the target service package of each data object, wherein the environment components perform the services for the data objects based on the mapping of the discovered and classified environment components to the target service packages.

12. The computer program product as recited in claim 11, wherein the discovered environment components include at least one of file servers, retention servers, backup servers, databases, and applications.

13. The computer program product as recited in claim 11, wherein the computer executable instructions that are configured to use an environment discovery module to discover all environment components within a computer system further include instruction configured to:
access environment discovery information from an environment discovery application that has performed an environment discovery operation.

14. The computer program product as recited in claim 11, wherein the computer executable instructions that are configured to use an environment discovery module to discover all environment components within a computer system further include computer executable instructions configured to:
identify metadata describing the capabilities, features, and properties of each of the discovered environment components.

15. The computer program product as recited in claim 11, wherein the discovered environment components include storage locations, and wherein the computer executable instructions that are configured to classify each of the discovered environment components further include computer executable instructions configured to:
classify the storage locations in accordance with a combination of information management services that can be provided to the discovered data objects stored at each of the storage locations.

16. The computer program product as recited in claim 11, wherein the discovered environment components include service applications, and wherein the computer executable instructions that are configured to classify each of the discovered environment components further include computer executable instructions configured to:
classify the service applications in accordance with the capabilities of each of the service applications to provide information management services to the discovered data objects stored within the computer system.

17. The computer program product as recited in claim 11, wherein the discovered data objects include at least one of directories, volumes, files, folders, user data, system data, applications, services, operating systems, instructions, and computer settings.

18. The computer program product as recited in claim 11, further including computer executable instructions configured to:
generate metadata for each of the discovered environment components for describing their classification.

19. The computer program product as recited in claim 11, wherein the computer executable instructions are further configured to classify the discovered data objects in accordance with a predefined set of rules.

20. The computer program product as recited in claim 11, wherein the computer executable instructions are further configured to use one or more adapters to gather information related to the classification of the environment components.

* * * * *